(12) United States Patent
Tamura

(10) Patent No.: US 8,477,647 B2
(45) Date of Patent: Jul. 2, 2013

(54) CONNECTION SETTING APPARATUS, CONNECTION SETTING METHOD, AND COMPUTER PROGRAM PRODUCT

(75) Inventor: Yoshiteru Tamura, Nagoya (JP)

(73) Assignee: Buffalo Inc., Nagoya (JP)

( * ) Notice: Subject to any disclaimer, the term of this patent is extended or adjusted under 35 U.S.C. 154(b) by 261 days.

(21) Appl. No.: 13/010,721

(22) Filed: Jan. 20, 2011

(65) Prior Publication Data
US 2011/0176456 A1    Jul. 21, 2011

(30) Foreign Application Priority Data
Jan. 21, 2010    (JP) .................................. 2010-10582

(51) Int. Cl.
*H04L 12/56* (2006.01)
*H04J 1/16* (2006.01)

(52) U.S. Cl.
USPC ............ 370/252; 370/412; 370/419; 370/463

(58) Field of Classification Search
USPC .................. 370/252, 412, 419, 463
See application file for complete search history.

(56) References Cited

U.S. PATENT DOCUMENTS

| | | | |
|---|---|---|---|
| 6,728,546 B1 * | 4/2004 | Peterson et al. ............... | 455/462 |
| 2007/0049334 A1 | 3/2007 | Otsuka | |
| 2007/0268921 A1 * | 11/2007 | Iwazaki ........................ | 370/401 |

FOREIGN PATENT DOCUMENTS

| | | |
|---|---|---|
| JP | 11-134271 | 5/1999 |
| JP | 2004-165824 | 6/2004 |
| JP | 2007-60590 | 3/2007 |

OTHER PUBLICATIONS

Notification of Reason for Rejection dated Nov. 1, 2011 from Japanese Application No. 2010-010582.

* cited by examiner

*Primary Examiner* — John Pezzlo
(74) *Attorney, Agent, or Firm* — Beyer Law Group LLP

(57) ABSTRACT

A connection setting apparatus of configuring settings for connection with an external network is provided. The connection setting apparatus has a connector arranged and adapted to be connectable with a USB connector provided on a data communication card that is used to establish communication with the external network. In the connection setting apparatus, a storage is arranged and adapted to store identification information for identifying a carrier and a mobile communication network corresponding to the data communication card, in correlation with a connection setting provided for the carrier and the mobile communication network. The connection setting apparatus also has an acquirer arranged and adapted to obtain the identification information of the data communication card from the data communication card connected to the connector. The connection setting apparatus further has a setter arranged and adapted to specify a connection setting in correlation with the obtained identification information and actually configure connection settings based on the specified connection setting. This arrangement assures easy configuration of the network connection settings according to a simple algorithm.

7 Claims, 6 Drawing Sheets

Fig.6

| MODEL NAME | VID | PID | FW Ver. |
|---|---|---|---|
| AAAAA | CCCCC | EEEEE | 1.0 |
| AAAAA | CCCCC | FFFFF | 2.0 |
| AAAAA | DDDDD | GGGGG | 1.2 |
| AAAAA | ⋮ | ⋮ | ⋮ |
| BBBBB | ⋮ | ⋮ | ⋮ |
| ⋮ | ⋮ | ⋮ | ⋮ |

CONNECTION SETTING APPARATUS, CONNECTION SETTING METHOD, AND COMPUTER PROGRAM PRODUCT

CROSS REFERENCE TO RELATED APPLICATION

The present application claims priority from Japanese application P2010-10582A filed on Jan. 21, 2010, the content of which is hereby incorporated by reference into this application.

BACKGROUND

1. Field of the Invention

The present invention relates to a connection setting technique of configuring settings for connection with an external network.

2. Description of the Related Art

In recent years, mobile communication networks accessible to the Internet have been provided by various carriers (mobile network operators). Connection of a data communication card to an electronic device, for example, a personal computer, allows the user anywhere to have access to an external network, such as the Internet. For the first use of a data communication card, it is required to configure network connection settings suitable for a corresponding carrier. Such network connection settings are not restricted to the first use of a data communication card but are also required at the time of changing over the effective communication medium between a fixed line and the data communication card and at the time of changing over the effective communication medium among multiple data communication cards.

Series of processing required for the network connection settings is, however, rather time- and labor-consuming for the user and has difficulties especially for unskilled users. Various techniques have accordingly been proposed to assist the user in configuring the network connection settings. For example, a method disclosed in Japanese Patent Laid-Open No. 2007-060590 causes a table of correlating each model of a cell-phone to a type of a mobile communication network and network setting information to be stored in an electronic device. The method assumes a model of a connected cell-phone and issues an AT command corresponding to the assumed model. When there is a response to the issued AT command, the method utilizes information included in the response to identify the model of the cell-phone, subsequently refers to the table to identify the type of the mobile communication network, and configures network settings based on the identified model of the cell-phone and the identified mobile communication network. When there is no response to the issued AT command, on the other hand, the method repeats this series of processing with changing a model to be assumed, until the model of the cell-phone is identified. This proposed method, however, requires rather complicated series of processing to configure the network connection settings. Simplification of the required processing is thus demanded.

SUMMARY

By taking into account at least partly the issue discussed above, there is a requirement to readily configure network connection settings according to a simple algorithm.

In order to address at least part of the requirement described above, the present invention provides various embodiments and applications described below.

A first aspect of the present invention is directed to a connection setting apparatus of configuring settings for connection with an external network. The connection setting apparatus includes a connector arranged and adapted to be connectable with a USB connector provided on a data communication card that is used to establish communication with the external network; a storage arranged and adapted to store identification information for identifying a carrier and a mobile communication network corresponding to the data communication card, in correlation with a connection setting provided for the carrier and the mobile communication network; an acquirer arranged and adapted to obtain the identification information of the data communication card from the data communication card connected to the connector; and a setter arranged and adapted to specify a connection setting in correlation with the obtained identification information and actually configure connection settings based on the specified connection setting.

The connection setting apparatus according to this aspect of the invention stores the identification information for identifying a carrier and a mobile communication network corresponding to a data communication card equipped with a USB connector, in correlation with a connection setting provided for the carrier and the mobile communication network. The connection setting apparatus obtains the identification information from the data communication card connected to the connector and actually configures the connection settings based on a connection setting correlated to the obtained identification information. This arrangement assures easy configuration of the connection settings. The data communication card is connected to the connector via its USB connector. Such connection enables the connection setting apparatus to recognize the connected data communication card as a USB device and obtain the identification information by simply reading the data communication card. Namely this arrangement assures easy configuration of the connection settings according to a simple algorithm.

In one preferable embodiment of the connection setting apparatus, the identification information includes a vender ID and a product ID of the data communication card.

In the connection setting apparatus of this embodiment, the identification information includes the vender ID and the product ID of the data communication card. There is an unequivocally specified relation of a vender ID and a product ID of each data communication card to a carrier and a mobile communication network corresponding to the data communication card. This arrangement thus effectively specifies the carrier and the mobile communication network corresponding to the data communication card.

In one preferable embodiment of the connection setting apparatus, the connection setting apparatus further includes an acceptor arranged and adapted to display the specified connection setting and receive a user's instruction representing either permission for or rejection of the displayed connection setting. When the acceptor receives the user's instruction representing permission for the displayed connection setting, the setter actually configures the connection settings based on the displayed connection setting.

The connection setting apparatus of this embodiment displays the specified connection setting and, on reception of the user's permission for the displayed set, actually configures the connection settings based on the displayed connection setting. This arrangement enables the connection settings to be configured with preferably reflecting the user's intention. The user is only asked to enter either permission for or rejection of the displayed connection setting and is not required to manually enter the individual details of connection settings. This arrangement thus assures easy configuration of the connection settings.

In one preferable embodiment of the connection setting apparatus, the setter configures the connection settings every time new connection of the data communication card to the connector is detected.

The connection setting apparatus of this embodiment configures the connection settings every time new connection of the data communication card is detected. This arrangement assures configuration of the connection settings at the user's desired timing for making communication with the data communication card. This arrangement does not require the user's any additional operation for starting the process of configuring the connection settings, thus enhancing the convenience.

In one preferable embodiment of the connection setting apparatus, the connection setting apparatus further includes a communicator arranged and adapted to establish communication with the external network by a fixed line. The setter configures the connection settings with giving preference to communication with the data communication card over communication with the communicator.

The connection setting apparatus of this embodiment configures the connection settings with giving preference to communication with the data communication card over communication by a fixed line. The connection of the data communication card suggests the high probability that the user desires to use the data communication card for communication. This arrangement preferably enables easy reflection of the user's intention, thus enhancing the convenience.

In one preferable embodiment of the connection setting apparatus, the connection setting apparatus further includes a verifier arranged and adapted to verify whether operation of the data communication card is guaranteed or not guaranteed, based on information obtained by communication with the data communication card from a server, which is connected with the external network and stores information regarding guarantee of the operation of the data communication card connected to the connector.

The connection setting apparatus of this embodiment verifies whether the operation of the data communication card is guaranteed or not guaranteed, based on the information obtained by communication with the data communication card from the server that stores the information regarding the guarantee of the operation of the data communication card. When communication with the data communication card is somehow enabled, this arrangement informs the user of the guarantee or non-guarantee of the operation of the data communication card, thus enhancing the convenience.

In one preferable embodiment of the connection setting apparatus, the connection setting apparatus further includes an updater arranged and adapted to obtain a new version of the firmware from the server and update the firmware of the connection setting apparatus. When a result of the verifying represents that the operation is not guaranteed, the verifier subsequently verifies whether the operation of the data communication card is guaranteed or not guaranteed on assumption of update of the firmware of the connection setting apparatus. The updater updates the firmware of the connection setting apparatus when it is verified that the operation is guaranteed on the assumption of update of the firmware.

When the operation of the data communication card is guaranteed on the assumption of update of the firmware, the connection setting apparatus of this embodiment obtains a new version of the firmware from the server and updates the firmware. This arrangement enables the data communication card to be utilized under operation guarantee, thus enhancing the convenience.

The technique of the invention is not restricted to the connection setting apparatus having any of the arrangements as described above, but may be actualized by diversity of other applications, for example, a connection setting method, a computer program product, and a connection setting system including both the connection setting apparatus and a sever.

BRIEF DESCRIPTION OF THE DRAWINGS

FIG. 6 is an explanatory diagrammatic representation of a concrete example of a compatibility list CL.

DESCRIPTION OF THE PREFERRED EMBODIMENTS

The present invention is described in detail below with reference to some embodiments thereof as illustrated in the accompanied drawings.

A. Embodiment

A-1. General Structure of Router 20

Figure 1:
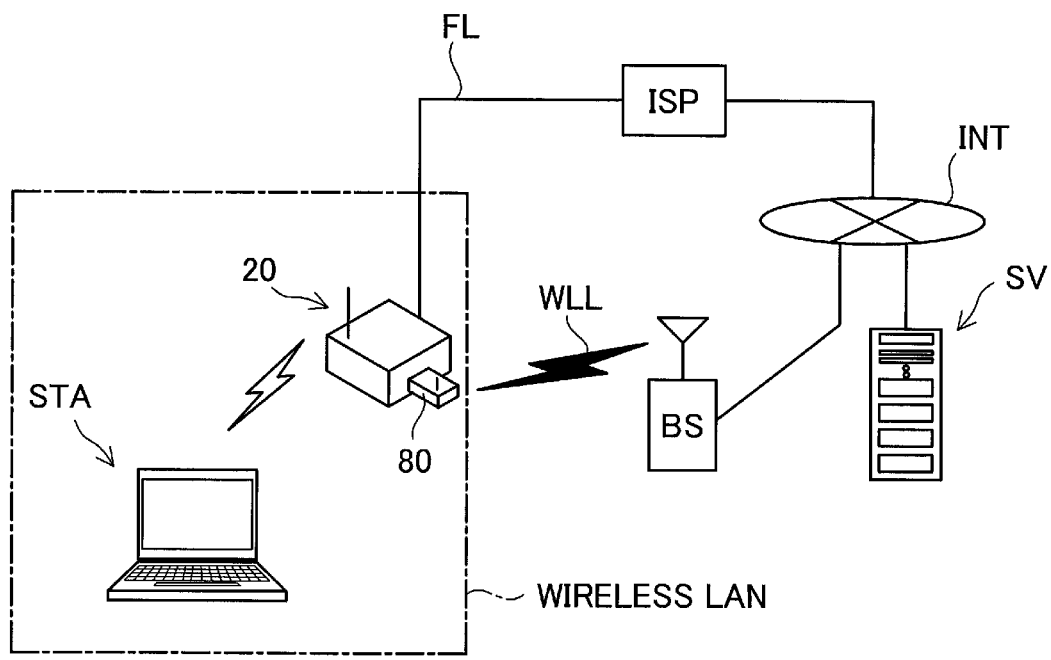
FIG. 1 is a diagrammatic representation of one application of a router as one embodiment of the connection setting apparatus according to the present invention.

FIG. 1 shows one application of a router 20 as one embodiment of the connection setting apparatus according to the present invention. The router 20 represents a router device also functioning as an access point of a wireless LAN. In this embodiment, as shown in FIG. 1, the router 20 and a terminal STA cooperate to establish a wireless LAN in conformity with IEEE 802.11 standard. The router 20 and the terminal STA may be interconnected by a cable. There may be multiple terminals STA. The router 20 is structured to be connectable with the Internet INT via an Internet service provider ISP by a fixed line FL. A data communication card 80 is connected to the router 20 and establishes a wireless line WLL that enables the router 20 to be connected with the Internet INT via a base station BS. The terminal STA is accessible to the Internet INT via the router 20. A server SV is connected to the Internet INT. The functions of the server SV will be described later. The router 20 and the server SV may be connected to any external network, e.g., a WAN (Wide Area Network), in place of the Internet INT.

Figure 2:
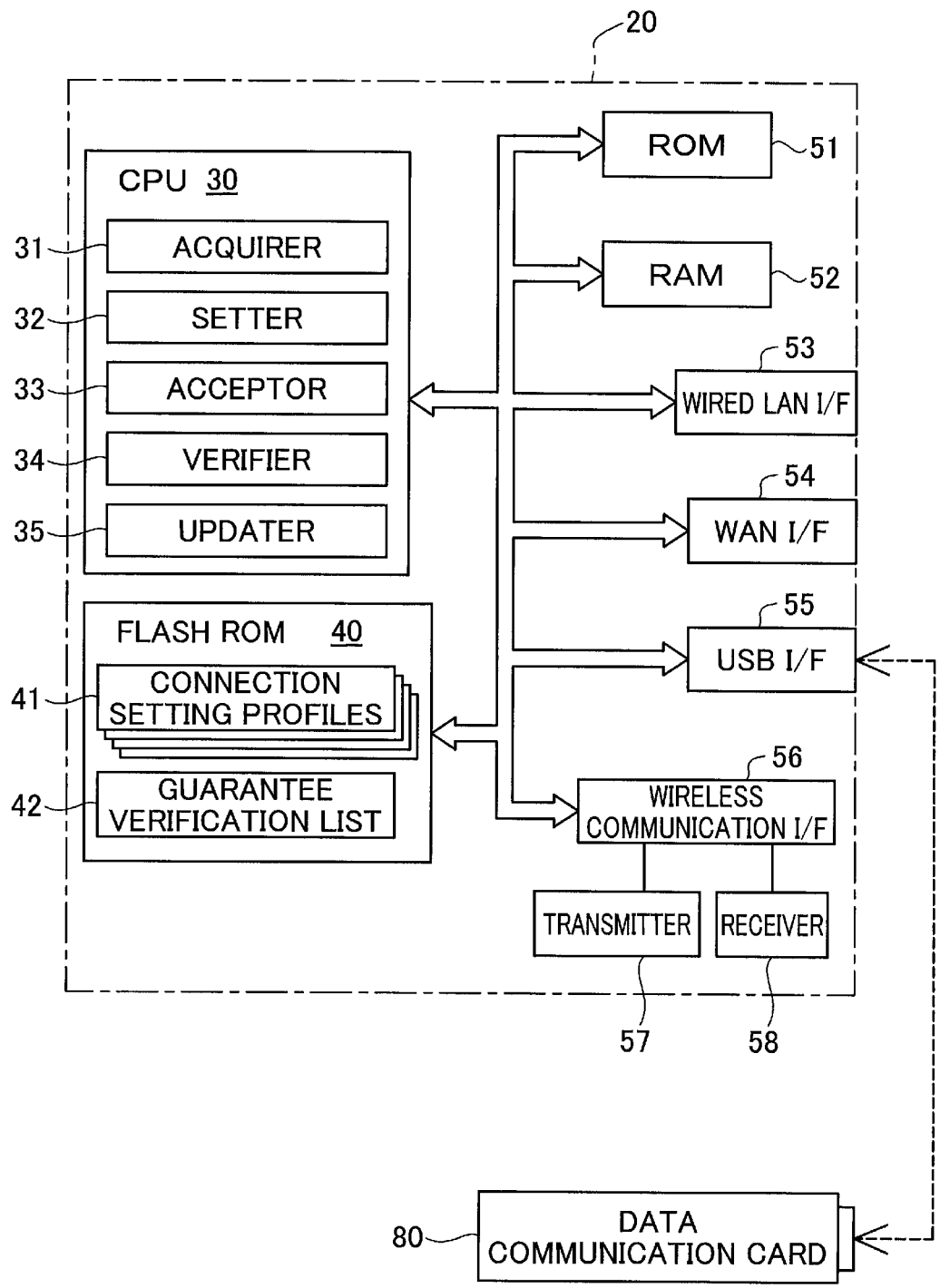
FIG. 2 is an explanatory diagrammatic representation of the general structure of the router.

The general structure of the router 20 is shown in FIG. 2. As illustrated, the router 20 includes a CPU 30, a flash ROM 40, a ROM 51, a RAM 52, a wired LAN interface 53, a WAN interface 54, a USB interface 55, and a wireless communication interface 56, which are interconnected by a bus.

The CPU 30 loads and executes programs, such as firmware, which are stored in the flash ROM 40 or in the ROM 51, on the RAM 52 to control the overall operations of the router 20. The CPU 30 executes the programs to have the functions of an acquirer 31, a setter 32, an acceptor 33, a verifier 34, and an updater 35. The details of these functional blocks will be described later.

The flash ROM 40 stores connection setting profiles 41 and a guarantee verification list 42, which will be described later in detail. The WAN interface 54 works to make connection with the external network, such as the Internet INT, by the fixed line FL. The USB interface 55 is a host-side USB connector that receives connection of any of various USB devices. There may be multiple USB interfaces 55. Here the USB interface 55 of this embodiment is equivalent to the connector in the claims of the invention. The wireless communication interface 56 is connected with a transmitter 57 of sending radio waves and with a receiver 58 of receiving radio waves. The transmitter 57 and the receiver 58 are built in the router 20 to allow for transmission of radio waves to the exterior and reception of radio waves from the exterior.

The data communication card 80 equipped with a USB connector is connectable to the USB interface 55 of the router 20 as illustrated in FIG. 2. The data communication card 80 has a built-in modem structured to establish the wireless line WLL mentioned above and to make connection with the Internet INT via a mobile communication network provided by a carrier.

The connection setting profile 41 is provided for each carrier and each mobile communication network of the wireless line WLL established by the data communication card 80 and records connection information for making connection to the mobile communication network provided by the carrier. The connection information represents a series of information unequivocally specified for each carrier and each mobile communication network and includes, for example, the name of a carrier, a telephone number, an APN (access point name), a user name, and a password. Each of the connection setting profiles 41 is managed in correlation with a vender ID (hereafter may be referred to as VID) and a product ID (hereafter may be referred to as PID) of the data communication card 80. The VID is an identification number unequivocally specified for each vender or manufacturer of the data communication card 80. The PID is an identification number representing a model number of the data communication card 80. There is an unequivocally specified relation of the VID and the PID of the data communication card 80 to the corresponding carrier and mobile communication network. When a relation of respective combinations of VIDs and PIDs to respective combinations of carriers and mobile communication networks is provided in advance, the carrier and the mobile communication network may be identified corresponding to the combination of the VID and the PID. The connection information may thereby be specified corresponding to the identified carrier and mobile communication network.

The guarantee verification list 42 represents data recording whether the manufacturer of the router 20 guarantees or does not guarantee the operations of communication with each type of the data communication card 80 connected to the router 20 in use. In this embodiment, the guarantee verification list 42 records combinations of VIDs and PIDs of respective data communication cards 80 within a guaranteed operating range. Methods of utilizing and updating this guarantee verification list 42 will be described later.

A-2. Modem Identification Process

Figure 3:
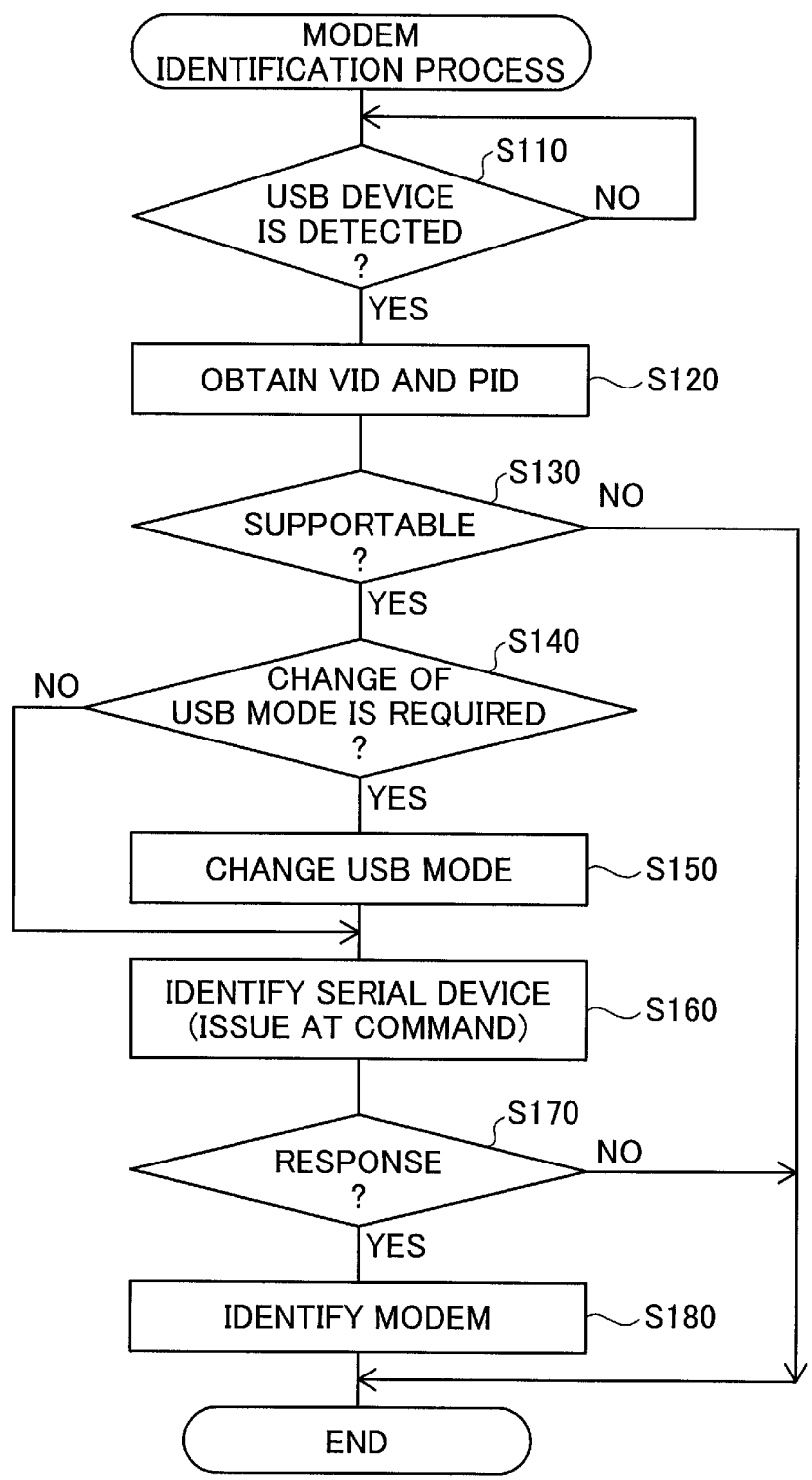
FIG. 3 is a flowchart showing a modem identification process.

A modem identification process performed in the router 20 is described with reference to FIG. 3. The modem identification process is performed to identify the data communication card 80 connected to the USB interface 55 of the router 20 as a modem to be usable. With referring to FIG. 3, on the start of this process, the CPU 30 stands by for connection of any USB device to the USB interface 55 (step S110). In response to detection of a connected USB device (step S110: Yes), the CPU 30 or specifically the acquirer 31 thereof obtains a VID and a PID of the detected USB device (step S120). At this stage, the CPU 30 generally recognizes the connected USB device. The CPU 30 may thus read a specific storage area of the recognized USB device to obtain the VID and the PID.

After obtaining the VID and the PID, the CPU 30 determines whether the connected USB device is supportable by the router 20 (step S130). In this embodiment, the supportability or non-supportability is determined, based on a result of matching of the combination of the VID and the PID obtained at step S120 with any of the combinations of VIDs and PIDs recorded in the connection setting profiles 41. The CPU 30 determines as supportable upon matching of the combination, while determining as non-supportable upon no matching of the combination.

When determining as non-supportable (step S130: No), the CPU 30 immediately terminates the modem identification process. When determining as supportable (step S130: Yes), on the other hand, the CPU 30 subsequently determines whether a change of a USB mode is required (step S140). The requirement or the non-requirement is determined, based on a result of recognition of the USB device connected to the USB interface 55 as a modem.

Upon requirement for a change of the USB mode (step S140: Yes), i.e., when the connected USB device is not recognized as a modem, in order to use the USB device as a modem, it is required to change the USB mode and thereby allow for recognition of the USB device as a modem. The CPU 30 accordingly changes the USB mode from its initial mode, e.g., a 'mass storage' mode, to a 'modem' mode (step S150). This enables the CPU 30 to recognize the connected data communication card 80 as a CDC (Communication Device Class) device, or a modem.

Upon non-requirement for a change of the USB mode (step S140: No), i.e., when the connected USB device is recognized as a modem, or after a completed change of the USB mode (step S150), the CPU 30 issues an AT command and identifies a serial device (step S160). Issuing the AT command enables the operation verification of the connected modem and allows for identification of each serial device even in the case of recognition of multiple USB serial devices. The CPU 30 determines whether to receive a response code from the data communication card 80 (step S170). Upon reception of the response code (step S170: Yes), the CPU 30 identifies the data communication card 80 as a modem to be usable (step S180) and terminates the modem identification process. Upon no reception of the response code (step S170: No), on the other hand, the CPU 30 terminates the modem identification process without such identification.

A-3. Connection Setting Process

Figure 4:
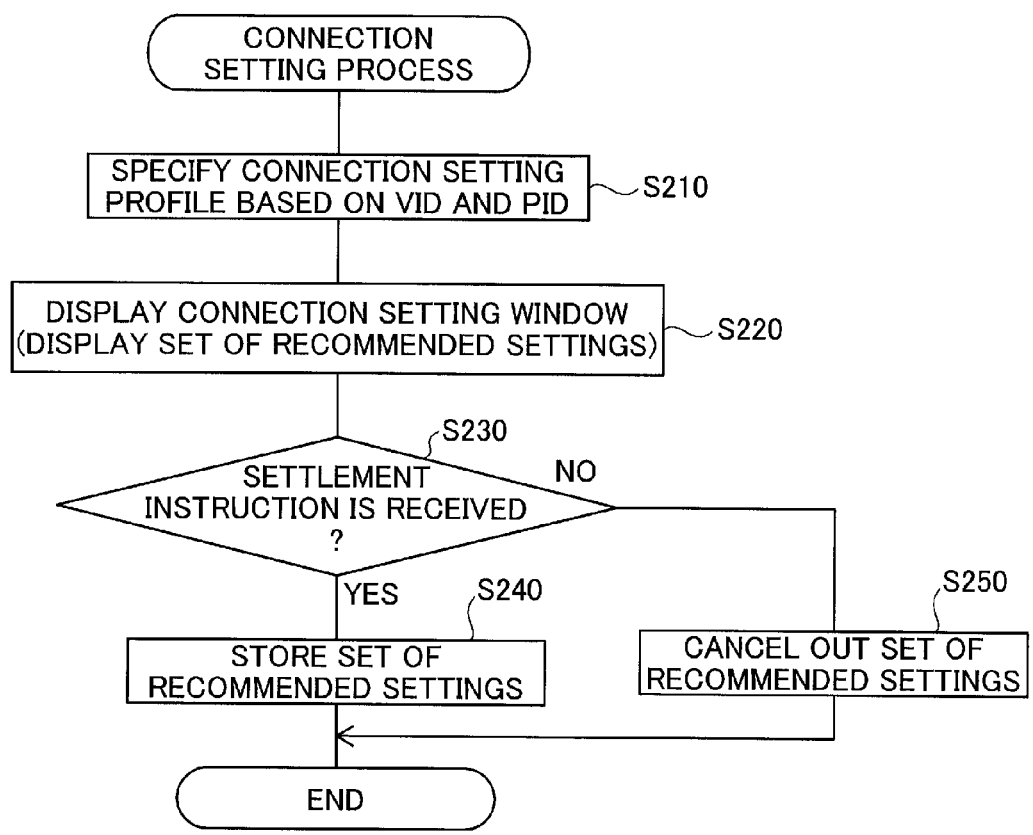
FIG. 4 is a flowchart showing a connection setting process.

A connection setting process performed in the router 20 is described with reference to FIG. 4. The connection setting process is performed after the modem identification process described above and configures the connection settings to establish the wireless line WLL by utilizing the data communication card 80. In this embodiment, after the implementation of the modem identification process and the establishment of a wireless LAN between the router 20 and the terminal STA, the connection setting process is started at the timing when the terminal STA with a WEB browser program running thereon sends an HTTP request to an IP address of a default connection destination and when the router receives this HTTP request. The connection setting process may alternatively be started at the timing when the data communication card 80 is connected to the USB interface 55 or at the timing when the router 20 is powered on with the data communication card 80 connected thereto. Referring to FIG. 4, on the start of the connection setting process, the CPU 30 specifies a connection setting profile 41 correlated to the VID and the PID obtained at step S120 (step S210).

After specification of the correlated connection setting profile 41, the CPU 30 displays a connection setting window on a monitor screen of the terminal STA via the WEB browser (step S220). More specifically, in response to reception of the HTTP request from the terminal STA, the CPU 30 performs DNS spoofing and responds back specified setting window data. A set of connection settings recorded in the connection setting profile 41 specified at step S210 is displayed as a set of recommended settings in the setting window.

On display of the connection setting window, the CPU 30 or specifically the acceptor 33 thereof receives the user's entry representing either permission for or rejection of the displayed set of recommended settings via the browser of the terminal STA and determines whether the user's settlement instruction for the displayed set of recommended settings is received (step S230). Upon reception of the user's settlement instruction (step S230: Yes), the CPU 30 or specifically the setter 32 thereof stores the settled set of recommended settings and actually configures the connection settings based on the stored set of recommended settings (step S240). Even when the connection settings have been configured in advance in such a manner as to be communicable by the fixed line FL via the WAN interface 54, the CPU 30 configures the connection settings with giving preference to communication by the wireless line WLL over communication by the fixed line FL at step S240. There is rare for the user to utilize the fixed line FL and the wireless line WLL simultaneously. The connection of the data communication card 80 suggests the high probability that the user desires to adopt communication with the data communication card 80. This arrangement preferably enables easy reflection of the user's intention without requiring the user's any additional operation, thus enhancing the convenience.

Upon no reception of the user's settlement instruction (step S230: No), on the other hand, the CPU 30 cancels out the displayed set of recommended settings (step S250). When the user manually enters a desired set of connection settings that is different from the set of recommended settings displayed via the Web browser, the CPU 30 may actually configure the connection settings based on the user's entered set of connection settings. The connection setting process is then terminated.

A-4. Operation Verification Process

Figure 5:
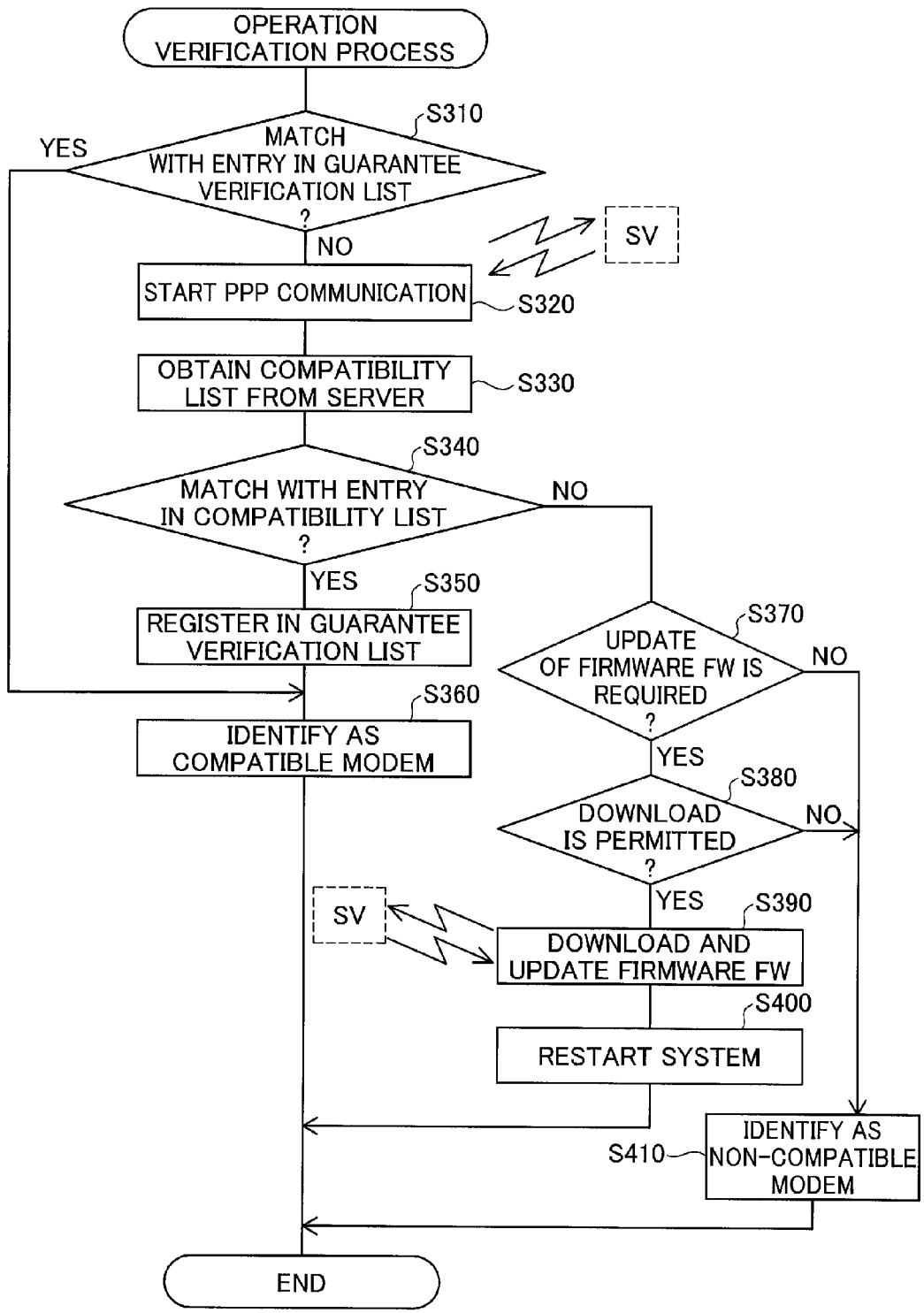
FIG. 5 is a flowchart showing an operation verification process.

An operation verification process performed in the router 20 is described with reference to FIG. 5. The operation verification process is performed after the connection setting process described above and verifies whether the operations of the data communication card 80 applied to the router 20 are guaranteed or not guaranteed by the manufacturer of the router 20. Even when the connection of the data communication card 80 to the router 20 enables the user to somehow access the Internet INT, some types of data communication cards 80 may cause operation failures during the access. This is the reason why the operation verification process is required. In this embodiment, the operation verification process is started in the state where the connection setting process has been performed to configure the connection settings and enables communication by the wireless line WLL. Referring to FIG. 5, on the start of the operation verification process, the CPU 30 or specifically the verifier 34 thereof determines whether the combination of the VID and the PID of the data communication card 80 obtained at step S120 (FIG. 3) matches with any entry in the guarantee verification list 42 (step S310). Such matching determines whether the connected data communication card 80 is within a guaranteed operating range specified by the manufacturer of the router 20. The CPU 30 determines to be within the guaranteed operating range upon matching of the combination of the VID and the PID of the data communication card 80 with an entry in the guarantee verification list 42, while determining to be out of the guaranteed operating range upon no matching of the combination of the VID and the PID with any entry. The manufacturer of the router 20 investigates the compatibilities of self-manufactured router devices with variety of commercially available data communication cards equipped with USB connectors and stores the result of the investigation as the guarantee verification list 42 in the flash ROM 40 at the time of manufacturing. The guarantee verification list 42 may have been updated at step S350 in a previous cycle of the operation verification process executed before a current cycle (described later in detail).

Upon matching with an entry in the guarantee verification list 42 (step S310: Yes), the connected data communication card 80 is determined to be within the guaranteed operating range and to be properly operable. The CPU 30 accordingly identifies the data communication card 80 as a compatible modem within the manufacturer's guaranteed operating range (step S360) and terminates the operation verification process. Upon no matching with any entry in the guarantee verification list 42 (step S310: No), on the other hand, there is a possibility that the connected data communication card 80 is out of the guaranteed operating range. A subsequent series of processing described below is then performed to further determine whether the data communication card 80 to be within or out of the guaranteed operating range.

Upon no matching with any entry in the guarantee verification list 42, the CPU 30 starts PPP (Point-to-Point Protocol) communication with the server SV (step S320) and obtains a compatibility list CL from the server SV via the wireless line WLL (step S330). The server SV is provided by the manufacturer of the router 20. A concrete example of the compatibility list CL is shown in FIG. 6. As illustrated, the compatibility list CL records a model name of each router device manufactured by the manufacturer of the router 20 in correlation with VIDs and PIDs of available data communication cards equipped with USB connectors, which are expected to be connected to the router device, and version information of firmware FW of the router device, which gives guarantee to the operations for communication with each data communication cards. For example, a router device of a model name 'AAAAA' having the firmware FW of a version '1.0' or a higher version is within the guaranteed operating range with respect to a data communication card with a VID 'CCCCC' and a PID 'EEEEE'. The manufacturer of the router 20 investigates the compatibilities of self-manufactured router devices with variety of commercially available data communication cards equipped with USB connectors and stores the result of the investigation as the compatibility list CL in a recording medium of the server SV. The compatibility list CL is occasionally updated with the progress of the investigation and with development of new products.

When obtaining the compatibility list CL from the server SV, the CPU 30 determines whether the combination of the own model name of the router 20 and the version information of the firmware FW recorded in the ROM 51 or the flash ROM 40 with the VID and the PID obtained at step S120 matches with any entry in the compatibility list CL (step S340).

Upon matching with an entry in the compatibility list CL (step S340: Yes), the connected data communication card 80 is determined to be within the guaranteed operating range. The CPU 30 accordingly registers the combination of the VID and the PID obtained at step S120 into the guarantee verification list 42 (step S350). Such registry enables the processing of steps S320 through S340 to be skipped on the occasion of a next connection of the same data communication card 80 to the router 20. The CPU 30 identifies the data communication card 80 as a compatible modem within the manufacturer's guaranteed operating range (step S360) and terminates the operation verification process.

Upon no matching with any entry in the compatibility list CL (step S340: No), on the other hand, the CPU 30 subsequently determines whether update of the firmware FW is required (step S370). The requirement for update of the firmware FW is determined, only when it is determined at step S340 that the combination of the model name, the VID, and the PID matches with an entry in the compatibility list CL but that the version information of the firmware FW is older than the version information recorded in the entry of the compatibility list CL.

Upon no requirement for update of the firmware FW (step S370: No), i.e., when update of the firmware FW still fails to make the connected data communication card 80 fall into the guaranteed operating range, the CPU 30 identifies the data communication card 80 as a non-compatible modem (step S410). In this embodiment, in the event of identification as a non-compatible modem, the CPU 30 entirely prohibits subsequent communication with the data communication card 80. This arrangement effectively prevents potential troubles occurring during the operations with the data communication card 80.

Upon requirement for update of the firmware FW (step S370: Yes), on the other hand, the CPU 30 displays an inquiry window via the WEB browser on the monitor screen of the terminal STA to ask the user to permit or reject downloading a newer version of the firmware FW, which makes the data communication card 80 fall into the guaranteed operating range, from the server SV and determines whether to receive the user's permission for downloading (step S380).

When not receiving the user's permission for downloading (step S380: No), the CPU 30 identifies the data communication card 80 as a non-compatible modem (step S410). When receiving the user's permission for downloading (step S380: Yes), on the other hand, the CPU 30 or specifically the updater 35 thereof downloads a newer version of the firmware FW, which makes the data communication card 80 fall into the guaranteed operating range, from the server SV via the wireless line WLL, so as to update the firmware FW (step S390). The CPU 30 then restarts the system (step S400) and terminates the operation verification process.

A-5. Effects

The router 20 structured as described above has the connection setting profiles 41, each storing a combination of a VID and a PID used for identifying a carrier and a mobile communication network corresponding to each data communication card equipped with a USB connector, in correlation with a set of connection settings provided for the carrier and the mobile communication network. The router 20 obtains a VID and a PID from the data communication card 80 connected to the USB interface 55 and configures the connection settings, based on a set of connection settings correlated to the obtained VID and PID in a corresponding connection setting profile 41. This arrangement assures easy configuration of the connection settings. The data communication card 80 is connected via the USB interface 55, so that the router 20 recognizes the connected data communication card 80 as a USB device. The router 20 can thus obtain the VID and the PID by simply reading a predetermined storage area. This enables the connection settings to be readily configured according to a simple algorithm. When the data communication card 80 is recognized as a modem, there is a need to obtain required pieces of information by utilizing, for example, an AT command corresponding to the model of the data communication card 80.

The router 20 displays a set of connection settings in the specified connection setting profile 41 as a set of recommended settings. The user is only asked to enter either permission for or rejection of the displayed set of recommended settings and is not required to manually enter the individual details of connection settings. This arrangement enables the connection settings to be readily configured.

The router 20 verifies whether the operations of the data communication card 80 are guaranteed or not guaranteed, based on information obtained by communication with the data communication card 80 from the server SV, which stores information regarding the guarantee or non-guarantee of the operations of the data communication card 80. When communication is somehow made with the data communication card 80, the user is informed of whether the operations of the data communication card 80 are guaranteed or not guaranteed. This arrangement enhances the convenience.

In the case where updating the firmware FW to a newer version makes the data communication card 80 fall into the guaranteed operating range, the router 20 downloads the newer version from the server SV to update the firmware FW. This arrangement enables the data communication card 80 to be utilized within the guaranteed operating range, thus enhancing the convenience.

The router 20 has the functions and effects described above in diversity of applications of the data communication card 80, for example, in the case of connecting a data communication card 80 to the router 20 for the first time, as well as in the case of using one data communication card 80 iteratively connected to and disconnected from the router 20, and in the case of selectively using two or more data communication cards 80 according to the circumstances.

B. Modifications

Some modifications of the above embodiment are described below.

B-1. Modification 1

In the embodiment described above, the connection setting process displays a set of connection settings specified corresponding to the combination of the VID and the PID as a set of recommended settings and actually configures the connection settings based on the displayed set of recommended settings only when the user gives permission for the displayed set. One modified structure may automatically configure the connection settings without asking for the user's permission. This modified arrangement does not require the user's additional operation to configure the connection settings, thus enhancing the convenience. In the embodiment described above, the modem identification process is started every time connection of a USB device is detected. The connection setting process is subsequently started at the timing of an access from the terminal STA to the router 20. The start timings of the respective processes may be specified arbitrarily. For example, every time a new connection of a USB device is detected, the modem identification process and the connection setting process may be performed sequentially. This modified arrangement assures configuration of the connection settings at the time of connection of a data communication card. This arrangement does not require the user's any additional operation to start the connection setting process, thus enhancing the convenience. In another example, the modem identification process may be started at the timing of every power supply to the router 20. Even when the power supply to the router 20 is cut off with the data communication card kept connected thereto, this modified arrangement assures configuration of the connection settings at the timing of next power supply.

B-2. Modification 2

In the embodiment described above, the data communication card 80 connected to the USB interface 55 is integrated with a USB connector. Alternatively an adapter equipped with a USB connector may be used in combination with a data communication card without a USB connector, so that a data communication card with a USB connector may be assembled as a whole and connected to the USB interface 55.

B-3. Modification 3

In the embodiment described above, when identifying the data communication card 80 as a non-compatible modem (step S410), the operation verification process entirely prohibits subsequent communication with the data communication card 80. Alternatively only selected operations for communication may be restricted. Instead of or in addition to such restriction of the operations, an alarm may be displayed on the monitor screen of the terminal STA. The alarm display further informs the user of whether the operations are guaranteed or not guaranteed, thus enhancing the convenience. The user may continue communication with the data communication card 80 at the user's own risk.

B-4. Modification 4

In the embodiment described above, the connection setting profiles 41 are stored in advance in the router 20. Latest connection setting profiles 41 correlated to respective combinations of VIDs and PIDs may be stored in the server SV. The router 20 may download a latest connection setting profile 41 via the fixed line FL or via the wireless line WLL to update the existing connection setting profile 41 in the router 20. This arrangement preferably handles the acceptance of data communication cards of newly marketing models to be connected to the router 20 or the access of new carriers to the business. The connection setting profile 41 may be updated during communication by the fixed line FL or during communication by the wireless line WLL after elapse of a predetermined time period. In the modem identification process performed in such a manner as to be communicable by the fixed line FL, the update of the connection setting profile 41 may be performed prior to the processing of step S130. This allows the model identification process to be performed consistently based on the latest connection setting profile 41.

B-5. Modification 5

In the embodiment described above, when the combination of the VIP and the PID of the data communication card 80 has no match with any entry in the guarantee verification list 42 (step S310: No), the operation verification process (FIG. 5) necessarily proceeds to step S320 and subsequent series of steps. One modified procedure of the operation verification process may evaluate the possibility of communication connection after step S310. The processing flow proceeds to step S320 and subsequent series of steps only when there is the possibility of communication connection, while identifying the data communication card 80 as a non-compatible modem (step S410) when there is no possibility of communication connection. This modified arrangement enhances the efficiency of the operation verification process. A concrete procedure of such additional evaluation may store a list representing the possibility or no possibility of communication connection in the flash ROM 40, e.g., at the time of manufacturing and retrieve this list for matching. This list may record PIDs and VIDs of data communication cards having the possibility of communication connection or alternatively PIDs and VIDs of data communication cards having no possibility of communication connection. Recording the latter information in the list excludes the data communication cards with no possibility of communication connection from objects to be processed. This arrangement effectively handles the acceptance of data communication cards with new PIDs and VIDs manufactured after the shipment of the router 20.

B-6. Modification 6

In the embodiment described above, the router 20 obtains the compatibility list CL from the server SV and makes the decisions at steps S340 and S370 in the operation verification process (FIG. 5). Alternatively the server SV may be in charge of making such decisions. According to one modified procedure, the router 20 may send its own model name and the VID and the PID of the data communication card 80 to the server SV and obtain the results of these decisions, in place of the compatibility list CL, from the server SV. This modified arrangement preferably decreases the communication traffic of the router 20 and thereby reduces the network loading.

B-7. Modification 7

In the embodiment described above, a set of connection settings provided for each carrier and each mobile communication network is specified, based on the combination of the VID and the PID. The information for specifying the set of connection settings is, however, not limited to the combination of the VID and the PID but may be any piece of information that allows for identification of a carrier and a mobile communication network. With a future change of the market entry of manufacturers of data communication cards and carriers, if it is allowed to identify a carrier and a mobile communication network only by a VID, the VID alone may be used to specify the set of connection settings.

B-8. Modification 8

The above embodiment describes the router 20 as one example of application of the connection setting apparatus according to the invention. The connection setting apparatus may be actualized by diversity of other electronic devices that are enabled communication by connection of the data communication card 80, for example, personal computers and PDAs (Personal Digital Assistants).

The embodiment and its modifications of the invention are described above. Among the various constituents and components included in the embodiment of the invention discussed above, those other than the constituents and components included in independent claims are additional and supplementary elements and may be omitted or combined according to the requirements. The embodiment and its modifications discussed above are to be considered in all aspects as illustrative and not restrictive. There may be many other modifications, changes, and alterations without departing from the scope or spirit of the main characteristics of the present invention. The technique of the invention is not restricted to the structure of the connection setting apparatus discussed above but may be actualized by diversity of other applications, for example, a connection setting method, a connection setting program product, and a connection setting system including both the connection setting apparatus and a server.

What is claimed is:

1. A connection setting apparatus of configuring settings for connection with an external network, comprising:
   a connector arranged and adapted to be connectable with a USB connector provided on a data communication card that is used to establish communication with the external network;
   a storage arranged and adapted to store identification information for identifying a carrier and a mobile communication network corresponding to the data communication card, in correlation with a connection setting provided for the carrier and the mobile communication network;

an acquirer arranged and adapted to obtain the identification information of the data communication card from the data communication card connected to the connector;

a setter arranged and adapted to specify a connection setting in correlation with the obtained identification information and actually configure connection settings based on the specified connection setting;

an acceptor arranged and adapted to display the specified connection setting and receive a user's instruction representing either permission for or rejection of the displayed connection setting, wherein when the acceptor receives the user's instruction representing permission for the displayed connection setting, the setter actually configures the connection settings based on the displayed connection setting; and a communicator arranged and adapted to establish communication with the external network by a fixed line, wherein the setter configures the connection settings with giving preference to communication with the data communication card over communication with the communicator.

2. The connection setting apparatus in accordance with claim 1, wherein the identification information includes a vender ID and a product ID of the data communication card.

3. The connection setting apparatus in accordance with claim 1, wherein the setter configures the connection settings every time new connection of the data communication card to the connector is detected.

4. The connection setting apparatus in accordance with claim 1, further comprising:

a verifier arranged and adapted to verify whether operation of the data communication card is guaranteed or not guaranteed, based on information obtained by communication with the data communication card from a server, which is connected with the external network and stores information regarding guarantee of the operation of the data communication card connected to the connector.

5. The connection setting apparatus in accordance with claim 4, further comprising:

an updater arranged and adapted to obtain a new version of the firmware from the server and update the firmware of the connection setting apparatus, wherein when a result of the verifying represents that the operation is not guaranteed, the verifier subsequently verifies whether the operation of the data communication card is guaranteed or not guaranteed on assumption of update of the firmware of the connection setting apparatus; and the updater updates the firmware of the connection setting apparatus when it is verified that the operation is guaranteed on the assumption of update of the firmware.

6. A connection setting method of configuring connection settings in a connection apparatus that is used to make connection with an external network, the connection setting method comprising:

storing identification information for identifying a carrier and a mobile communication network corresponding to a data communication card, which is connectable to the connection apparatus via a USB connector and is used to establish communication with the external network, in correlation with a connection setting provided for the carrier and the mobile communication network;

obtaining the identification information of the data communication card from the data communication card connected to the connector;

specifying a connection setting in correlation with the obtained identification information and actually configuring connection settings based on the specified connection setting;

displaying the specified connection setting;

receiving a user's instruction representing either permission for or rejection of the displayed connection setting;

in response to receiving the user's instruction representing permission for the displayed connection setting, configuring the connection settings based on the displayed connection setting; and establishing communication with the external network by a fixed line, wherein the configuring of the connection settings gives preference to communication with the data communication card over communication via the fixed line.

7. A computer program product comprising a computer-readable medium having computer program logic stored therein to enable a computer to configure connection settings for connection with an external network, the computer program logic comprising:

a program code for storing identification information for identifying a carrier and a mobile communication network corresponding to a data communication card, which is connectable to the connection apparatus via a USB connector and is used to establish communication with the external network, in correlation with a connection setting provided for the carrier and the mobile communication network;

a program code for obtaining the identification information of the data communication card from the data communication card connected to the connector;

a program code for specifying a connection setting in correlation with the obtained identification information and actually configuring connection settings based on the specified connection setting;

a program code for displaying the specified connection setting;

a program code for receiving a user's instruction representing either permission for or rejection of the displayed connection setting;

a program code for configuring the connection settings based on the displayed connection setting in response to receiving the user's instruction representing permission for the displayed connection setting; and a program code for establishing communication with the external network by a fixed line, wherein the configuring of the connection settings lives preference to communication with the data communication card over communication via the fixed line.

* * * * *